United States Patent
Nangia et al.

(10) Patent No.: US 12,256,343 B2
(45) Date of Patent: Mar. 18, 2025

(54) POWER HEADROOM REPORT FOR MULTIPLE UPLINK CARRIERS

(71) Applicant: Lenovo (Singapore) PTE. LTD., New Tech Park (SG)

(72) Inventors: Vijay Nangia, Woodridge, IL (US); Joachim Loehr, Wiesbaden (DE); Ebrahim MolavianJazi, Lincolnwood, IL (US); Hyejung Jung, Northbrook, IL (US); Ravi Kuchibhotla, Chicago, IL (US)

(73) Assignee: Lenovo (Singapore) Pte. Ltd., New Tech Park, Singapore (SG)

( * ) Notice: Subject to any disclaimer, the term of this patent is extended or adjusted under 35 U.S.C. 154(b) by 339 days.

(21) Appl. No.: 17/723,880

(22) Filed: Apr. 19, 2022

(65) Prior Publication Data
US 2022/0248345 A1    Aug. 4, 2022

Related U.S. Application Data

(63) Continuation of application No. 16/582,889, filed on Sep. 25, 2019, now Pat. No. 11,317,359.

(60) Provisional application No. 62/736,419, filed on Sep. 25, 2018.

(51) Int. Cl.
*H04W 52/36* (2009.01)
*H04L 5/00* (2006.01)
*H04W 72/0453* (2023.01)

(52) U.S. Cl.
CPC ........... *H04W 52/365* (2013.01); *H04L 5/005* (2013.01); *H04W 72/0453* (2013.01)

(58) Field of Classification Search
CPC .. H04W 52/365; H04W 72/0453; H04L 5/005
See application file for complete search history.

(56) References Cited

U.S. PATENT DOCUMENTS

| | | | |
|---|---|---|---|
| 9,615,336 B2* | 4/2017 | Vajapeyam | H04W 52/40 |
| 10,270,570 B2* | 4/2019 | Liu | H04L 5/0082 |
| 10,560,901 B2* | 2/2020 | Jung | H04W 52/50 |
| 10,568,041 B2* | 2/2020 | MolavianJazi | H04W 72/21 |

(Continued)

OTHER PUBLICATIONS

Huawei, Hilsilicon, "Discussion on PHR for SUL", 3GPP TSG RAN WG1 Meeting #92bis R1-1804286, Apr. 16-20, 2018, pp. 1-4.
(Continued)

*Primary Examiner* — Hai V Nguyen
(74) *Attorney, Agent, or Firm* — Kunzler Bean & Adamson

(57) ABSTRACT

Apparatuses, methods, and systems are disclosed for reporting power headroom for a serving cell configured with multiple uplink carriers. One apparatus includes a processor and a transceiver that receives a configuration of a first uplink carrier and a second uplink carrier for a serving cell. The processor determines the basis of a first power headroom for the first uplink carrier and determines the basis of a second power headroom for the second uplink carrier. The processor reports a power headroom report ("PHR") for the serving cell, the PHR comprising the first power headroom based on an actual first transmission on the first uplink carrier of the serving cell in response to the basis of the first power headroom being the actual first transmission and the basis of the second power headroom being a reference second transmission.

20 Claims, 6 Drawing Sheets

(56) References Cited

U.S. PATENT DOCUMENTS

| | | | |
|---|---|---|---|
| 10,660,044 B2* | 5/2020 | MolavianJazi | H04W 52/10 |
| 10,693,610 B2* | 6/2020 | Liu | H04L 5/0091 |
| 10,736,046 B2* | 8/2020 | MolavianJazi | H04W 52/365 |
| 10,827,441 B2* | 11/2020 | Loehr | H04W 52/365 |
| 10,856,320 B2* | 12/2020 | Jung | H04L 5/0042 |
| 10,986,583 B2* | 4/2021 | MolavianJazi | H04W 52/146 |
| 10,993,189 B2* | 4/2021 | Jung | H04W 72/0473 |
| 11,122,515 B2* | 9/2021 | MolavianJazi | H04W 52/08 |
| 11,159,289 B2* | 10/2021 | Rico Alvarino | H04W 72/0446 |
| 11,219,044 B2* | 1/2022 | Feng | H04W 72/535 |
| 11,290,242 B2* | 3/2022 | Jung | H04W 74/006 |
| 11,317,359 B2* | 4/2022 | Nangia | H04W 72/0453 |
| 11,419,066 B2* | 8/2022 | Jeon | H04W 72/0466 |
| 11,483,777 B2* | 10/2022 | Loehr | H04L 5/001 |
| 11,540,227 B2* | 12/2022 | MolavianJazi | H04W 52/365 |
| 11,677,532 B2* | 6/2023 | Jung | H04L 5/0091 370/329 |
| 11,770,775 B2* | 9/2023 | Jung | H04W 52/386 370/311 |
| 11,805,489 B2* | 10/2023 | Loehr | H04L 5/0053 |
| 11,997,617 B2* | 5/2024 | Adjakple | H04L 5/0092 |
| 2012/0218904 A1 | 8/2012 | Narasimha et al. | |
| 2015/0351053 A1 | 12/2015 | Jeong et al. | |
| 2017/0302419 A1* | 10/2017 | Liu | H04L 5/0078 |
| 2018/0352560 A1* | 12/2018 | Feng | H04W 72/21 |
| 2019/0044678 A1* | 2/2019 | Liu | H04L 5/001 |
| 2019/0045459 A1 | 2/2019 | Niu et al. | |
| 2019/0253986 A1* | 8/2019 | Jeon | H04L 5/0048 |
| 2019/0313343 A1* | 10/2019 | MolavianJazi | H04W 52/50 |
| 2019/0313348 A1* | 10/2019 | MolavianJazi | H04W 52/281 |
| 2019/0313437 A1* | 10/2019 | Jung | H04L 5/0042 |
| 2019/0387483 A1* | 12/2019 | Lee | H04W 52/42 |
| 2019/0394732 A1* | 12/2019 | Loehr | H04L 5/001 |
| 2020/0007293 A1* | 1/2020 | Wei | H04L 5/0053 |
| 2020/0053724 A1* | 2/2020 | MolavianJazi | H04W 52/367 |
| 2020/0100194 A1* | 3/2020 | Nangia | H04W 72/0453 |
| 2020/0221311 A1* | 7/2020 | Liu | H04L 5/0087 |
| 2020/0288412 A1* | 9/2020 | Ajdakple | H04W 52/365 |
| 2020/0296690 A1* | 9/2020 | Lee | H04W 4/40 |
| 2020/0322108 A1* | 10/2020 | Liu | H04W 48/12 |
| 2021/0014799 A1* | 1/2021 | Loehr | H04L 5/0098 |
| 2021/0153065 A1* | 5/2021 | Adjakple | H04W 28/0268 |
| 2021/0359882 A1* | 11/2021 | Liu | H04L 25/0226 |
| 2021/0400638 A1* | 12/2021 | Lee | H04W 24/10 |
| 2022/0174715 A1* | 6/2022 | Zhang | H04L 1/1812 |
| 2023/0016191 A1* | 1/2023 | Loehr | H04L 5/0053 |
| 2023/0029745 A1* | 2/2023 | Cui | H04L 5/0032 |
| 2023/0208578 A1* | 6/2023 | Liu | H04L 5/0091 370/330 |
| 2023/0217459 A1* | 7/2023 | Khoshnevisan | H04W 72/23 370/329 |

OTHER PUBLICATIONS

3GPP "3rd Generation Partnership Project; Technical Specification Group Radio Access Network; NR; User Equipment (UE) radio transmission and reception; Part 1: Range 1 Standalone (Release 15)", 3GPP TS 38.101-1 V15.2.0, Jun. 2018, pp. 1-126.

3GPP "3rd Generation Partnership Project; Technical Specification Group Radio Access Network; NR; User Equipment (UE) radio transmission and reception; Part 2: Range 2 Standalone (Release 15)", 3GPP TS 38.101-2 V15.2.0, Jun. 2018, pp. 1-68.

3GPP "3rd Generation Partnership Project; Technical Specification Group Radio Access Network; NR; Physical layer procedures for control (Release 15)", 3GPP TS 38.213 V15.2.0, Jun. 2018, pp. 1-99.

Samsung, "PHR and SUL", 3GPP TSG-RAN WG2 Meeting #103 R2-1811142, Aug. 23-27, 2018, pp. 1-2.

Samsung, "Summary of NR UL power control—CA/DC aspects", 3GPP TSG RAN WG1 Meeting #94 R1-1809778, Aug. 20-24, 2018, pp. 1-11.

* cited by examiner

POWER HEADROOM REPORT FOR MULTIPLE UPLINK CARRIERS

CROSS-REFERENCE TO RELATED APPLICATIONS

This application claims priority to U.S. Provisional patent application Ser. No. 16/582,889 entitled "POWER HEADROOM REPORT FOR MULTIPLE UPLINK CARRIERS" and filed on Sep. 25, 2019 for Vijay Nangia, Joachim Loehr, Ebrahim MolavianJazi, Hyejung Jung, and Ravi Kuchibhotla, which is incorporated herein by reference. U.S. Patent Application claims priority to U.S. Provisional Patent Application No. 62/736,419 entitled "POWER HEADROOM REPORT FOR SUPPLEMENTARY UPLINK OPERATION" and filed on Sep. 25, 2018 for Ebrahim MolavianJazi, Joachim Loehr, Vijay Nangia, Hyejung Jung, and Ravi Kuchibhotla, which is incorporated herein by reference.

FIELD

The subject matter disclosed herein relates generally to wireless communications and more particularly relates to reporting power headroom ("PH") for a UE configured with multiple uplink carriers for a serving cell.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Bandwidth Part ("BWP"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Licensed Assisted Access ("eLAA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Non-Supplementary Uplink ("NUL", e.g., a "normal" uplink carrier), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Power Headroom Report ("PHR"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Sounding Reference Signal ("SRS"), Synchronization Signal ("SS"), Supplementary Uplink ("SUL"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, such as 5G NR, it is possible to supplement an additional frequency band to an NR serving cell, referred to as supplementary uplink ("SUL"). However, defined power headroom reporting methods, including PHR report type selection criteria, are not defined for serving cells that include SUL operations.

BRIEF SUMMARY

Methods are disclosed for reporting power headroom for a serving cell configured with multiple uplink carriers. Apparatuses and systems also perform the functions of the methods. The methods may also be embodied in one or more computer program products comprising a computer readable storage medium that stores executable code that, when executed by a processor, perform the steps of the methods.

One method for generating a power headroom report for a serving cell configured with multiple uplink carriers includes receiving, by a user equipment ("UE"), a configuration of a first uplink carrier and a second uplink carrier for a serving cell, wherein the first uplink carrier and the second uplink carrier are different. The method includes determining whether a first power headroom for the first uplink carrier is to be based on an actual first transmission or a reference first transmission on the first uplink carrier. The method includes determining whether a second power headroom for the second uplink carrier is to be based on an actual second transmission or a reference second transmission on the second uplink carrier. The method includes reporting a power headroom report for the serving cell, the power headroom report comprising the first power headroom based on an actual first transmission on the first uplink carrier of the serving cell in response to determining that the first power headroom is to be based on the actual first transmission and the second power headroom is to be based on a reference second transmission.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
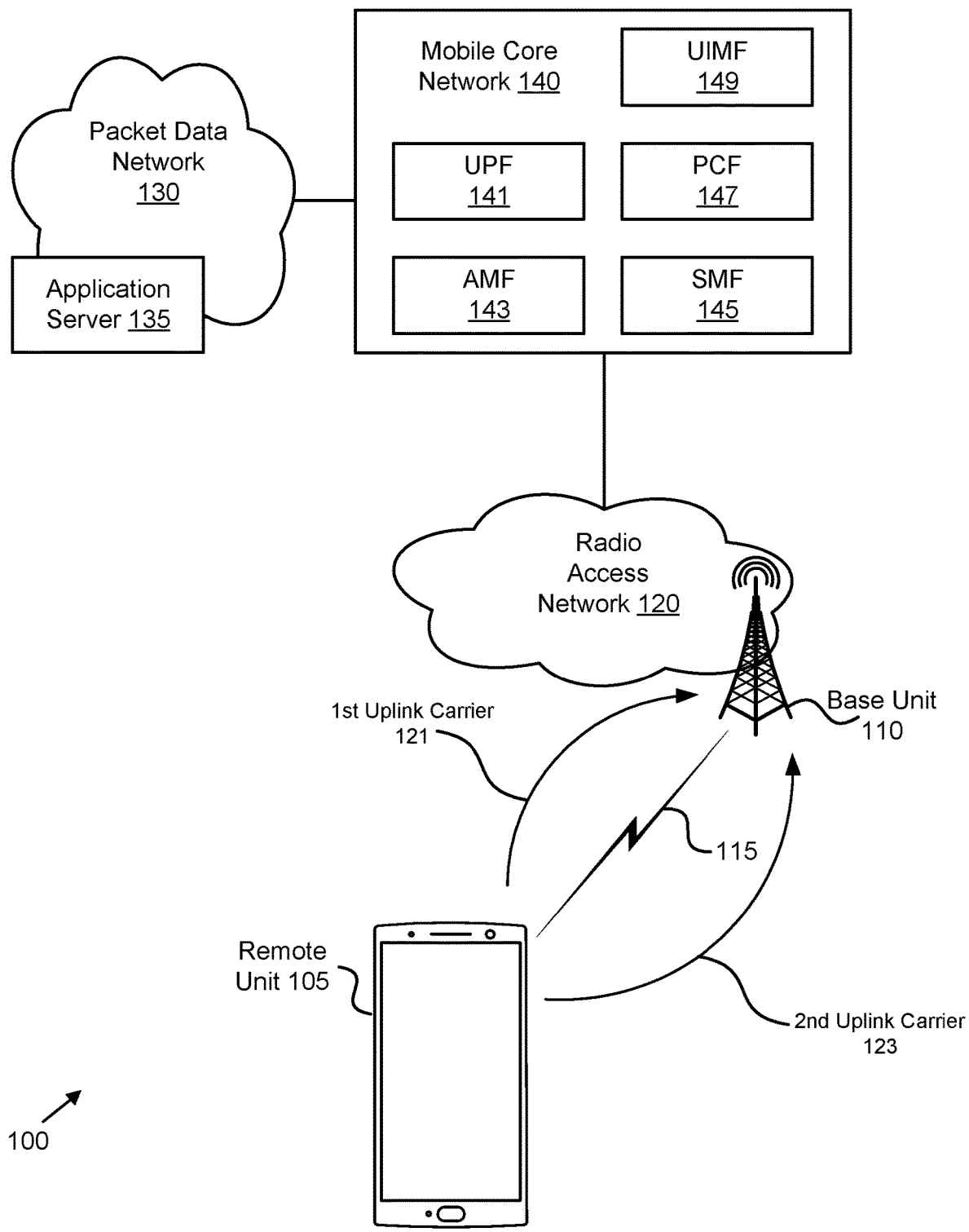
FIG. 1 is a schematic block diagram illustrating one embodiment of a wireless communication system for reporting power headroom for a serving cell configured with multiple uplink carriers.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for reporting a power headroom report for supplementary uplink operation including: indicating a capability for simultaneous or overlapping transmission of PUSCH on a first uplink carrier of a serving cell and SRS on a second uplink carrier of the serving cell; receiving a configuration for PUSCH power control parameters on the first uplink carrier of the serving cell and a configuration for SRS power control parameters on the second uplink carrier of the serving cell; receiving a power headroom report trigger; determining a power headroom report type for the serving cell based on the power headroom report trigger and a power headroom report type selection criterion; and reporting a power headroom report for the serving cell corresponding to an uplink carrier that is associated with the determined power headroom report type based on the corresponding power control parameters. The various embodiments described herein apply generally to UL transmissions. The UL transmissions can include PUSCH, PUCCH, SRS, or PRACH transmissions.

In 5G New Radio (NR), transmission and reception may include both centimeter- and millimeter-wave bands and higher frequency bands, e.g., from 6 GHz up to 70 GHz.

In addition, in 5G NR, it is possible to pair/supplement an additional carrier (which can be in a different frequency band) to an NR serving cell (in both TDD and FDD operation) as a complementary access link only for UL transmission purposes, so that two ULs are paired with a single DL in the NR serving cell. Such an additionally paired uplink carrier to a serving cell is called a supplementary (or secondary) uplink (SUL). For example, a SUL carrier on 700 MHz can complement/supplement an UL carrier (e.g., non-SUL carrier, also referred to as the "NUL" carrier) on 4, 30, or 70 GHz, where the SUL carrier can provide enhanced uplink coverage compared to the UL carrier. In some cases, the NR SUL carrier may fully or partially overlap in frequency with an LTE UL carrier.

Power headroom report (PHR) is an important element of UE operation to modify UE resource allocation upon significant change to the radio channel. Specification of PHR behavior in 5G NR for SUL carriers may involve various situations and scenarios requiring corresponding power headroom report type selection criteria.

Power headroom ("PH") is the difference between the nominal UE maximum transmit power and the estimated power for a transmission. The estimated power for a transmission is not the actual/used power for the transmission, but the transmit power that would have been used assuming that there would have been no upper limit on the transmit power. Accordingly, the PH level can be positive or negative. Here, a negative PH level indicates the amount by which the transmit power of the transmission is limited by the nominal UE maximum transmit power. For PUSCH transmission, a negative PH level indicates that the network has scheduled a higher data rate than the UE can support given the available transmission power. The network can then adjust the uplink data rate accordingly so that the UE is no longer power-limited.

Per [3GPP TS 38.213], if a UE transmits PUSCH in PUSCH transmission occasion i on UL BWP b of UL carrier f of serving cell c, the UE computes an actual power headroom in [dB] for a Type-1 report. Thus, if the UE determines that a Type-1 power headroom report for an activated serving cell is based on an actual PUSCH transmission, then for PUSCH transmission occasion i on active UL BWP b of carrier f of serving cell c using open-loop parameter set configuration with index j and pathloss reference with index $q_d$ and PUSCH power control adjustment state with index l, the UE computes the Type-1 PHR (a.k.a., PUSCH PHR) as $$PH_{type1,b,f,c}(i, j, q_d, l) = \qquad \text{Equation 1}$$
$$P_{CMAX,f,c}(i) - \{P_{O\_PUSCH,b,f,c}(j) + 10\log_{10}(2^\mu \cdot M_{RB,b,f,c}^{PUSCH}(i)) +$$
$$\alpha_{b,f,c}(j) \cdot PL_{b,f,c}(q_d) + \Delta_{TF,b,f,c}(i) + f_{b,f,c}(i, l)\}$$

where the Power Headroom of Equation 1 is in [dB] and all parameters are defined in 3GPP TS 38.213 (v15.3.0). In particular, the configured maximum UE output power, $P_{CMAX,f,c}$, is separately determined for each uplink carrier f of serving cell c.

If the UE does not transmit PUSCH in PUSCH transmission occasion i on UL BWP b of UL carrier f of serving cell c, then the UE cannot report an actual power headroom. This is due to the fact that if there is no PUCCH/PUSCH transmission in transmission occasion i, then $P_{cMAX,f,c}(i)$ cannot be determined. The UE instead reports a "virtual" power headroom based on a reference PUSCH transmission. Accordingly, if the UE determines that a Type-1 PHR for an activated serving cell is based on a reference PUSCH transmission, then for PUSCH transmission occasion i on active UL BWP b of carrier f of serving cell c, the UE computes the Type-1 power headroom in [dB] as $$PH_{type1,b,f,c}(i, j, q_d, l) = \tilde{P}_{CMAX,f,c}(i) - \qquad \text{Equation 2}$$
$$\{P_{O\_PUSCH,b,f,c}(j) + \alpha_{b,f,c}(j) \cdot PL_{b,f,c}(q_d) + f_{b,f,c}(i, l)\}$$

where $\tilde{P}_{MAX,f,c}(i)$ is computed assuming MPR=0 dB, A-MPR=0 dB, P-MPR=0 dB, $\Delta T_C$=0 dB, where MPR ("maximum power reduction"), A-MPR ("additional maximum power reduction), P-MPR ("power management maximum power reduction") and $\Delta T_C$ are power reduction/backoff terms. These power reduction/backoff terms are all defined in 3GPP TS 38.101 Rel-15. Note that as of NR Rel-15, only one PHR per serving cell is supported. Thus, when the UE 205 is configured with multiple UL carriers for a serving cell (e.g., NUL and SUL carriers), then the UE 205 needs to select only one PHR to report for the serving cell.

In some embodiments, if a UE determines that a Type-3 power headroom report for an activated serving cell is based on an actual SRS transmission then, for SRS transmission occasion i from SRS resource set $q_s$ on active UL BWP b of carrier f of serving cell c and if the UE is not configured for PUSCH transmissions on carrier f of serving cell c, the UE computes a Type-3 power headroom report as $$PH_{type3,b,f,c}(i, q_s) = \qquad \text{Equation 3}$$
$$P_{CMAX,f,c}(i) - \{P_{O\_SRS,b,f,c}(q_s) + 10\log_{10}(2^\mu \cdot M_{SRS,b,f,c}(i)) +$$
$$\alpha_{SRS,b,f,c}(q_s) \cdot PL_{b,f,c}(q_d) + h_{b,f,c}(i)\}$$

where the Power Headroom of Equation 3 is in [dB] and $P_{CMAX,f,c}(i)$, $P_{O\_SRS,b,f,c}(q_s)$, $M_{SRS,b,f,c}(i)$, $\alpha_{SRS,b,f,c}(q_s)$, $PL_{b,f,c}(q_d)$ and $h_{b,f,c}(i)$ are defined in 3GPP TS 38.213 (v15.3.0).

If the UE determines that a Type-3 power headroom report for an activated serving cell is based on a reference SRS transmission then, for SRS transmission occasion i from SRS resource set $q_s$ on UL BWP b of carrier f of serving cell c, and if the UE is not configured for PUSCH transmissions on UL BWP b of carrier f of serving cell c, the UE computes a Type-3 power headroom report as $$PH_{type3,b,f,c}(i, q_s) = \tilde{P}_{CMAX,f,c}(i) - \qquad \text{Equation 4}$$
$$\{P_{O\_SRS,b,f,c}(q_s) + \alpha_{SRS,b,f,c}(q_s) \cdot PL_{b,f,c}(q_d) + h_{b,f,c}(i)\}$$

where the Power Headroom of Equation 4 is in [dB] and where $q_s$ is a SRS resource set corresponding to SRS-ResourceSetId=0 and $P_{O\_SRS,b,f,c}(q_s)$, $\alpha_{SRS,f,c}(q_s)$, $PL_{b,f,c}(q_d)$ and $h_{b,f,c}(i)$ are defined in 3GPP TS 38.213 (v15.3.0) with corresponding values obtained from SRS-ResourceSetId=0. $\tilde{P}_{CMAX,f,c}(i)$ is computed assuming MPR=0 dB, A-MPR=0 dB, P-MPR=0 dB and $\Delta T_C$=0 dB. MPR, A-MPR, P-MPR and $\Delta T_C$ are power reduction/backoff terms, for example as defined in 3GPP TS 38.101-1 (v15.3.0) and 3GPP TS 38.101-2 (v15.3.0).

In 5G NR, whether to report actual or virtual PHR is based on the relationship between the scheduling information for an uplink transmission and a certain PHR "cut off" time instance/reference: For uplink transmissions whose scheduling information are received/processed/known before the PHR cut-off time actual PHR is reported, and for uplink transmissions whose scheduling information are received/processed/known after the PHR cut-off time (of if there is no transmission at all on a serving cell/carrier) virtual PHR will be reported. It may be noted that only one PHR per serving cell is supported in NR Rel-15.

For the case that a UE reports capability for a UE capability simultaneous transmission of PUSCH/PUCCH/SRS/PRACH on one uplink carrier of a serving cell, and only SRS transmission on the other uplink carrier, how to select the PHR type is not defined.

FIG. 1 depicts a wireless communication system 100 for UE power control for multiple UL carriers, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140. A remote unit 105 may be configured with multiple (wideband) UL carriers for a serving cell. For example, the remote unit 105 may be configured with a first UL carrier 121 and second UL carrier 123 for a serving cell of the base unit 110. Each UL carrier comprise a number of contiguous subcarriers, forming contiguous physical resource blocks ("PRBs"), wherein the remote unit 105 may be assigned a set of UL PRBs as an UL resource for transmission.

In various embodiments, the first UL carrier 121 and second UL carrier 123 are in different frequency bands. For example, the second UL carrier 123 may be a supplementary uplink ("SUL") carrier in an additional frequency band of the serving cell, with the first UL carrier 121 being the "normal" or non-supplementary uplink ("non-SUL" or "NUL") carrier. In 5G New Radio ("NR") deployments, transmission and reception may include both centimeter- and millimeter-wave bands and higher frequency bands, e.g., from 6 GHz up to 70 GHz. In such high frequency bands, a carrier bandwidth can be up to 400 MHz (or wider), and each carrier may consist of multiple non-contiguous chunks of spectrum.

In some embodiments, the remote units 105 communicate with an application server 135 via a network connection with the mobile core network 140. For example, an application (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 135 in the packet data network 130 using the PDU session. Note that the remote unit 105 may establish one or more PDU sessions (or other data connections) with the mobile core network 140. As such, the remote unit 105 may concurrently have at least one PDU session for communicating with the packet data network 130 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, a RAN node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 130, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over application programming interfaces ("APIs")), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, SGW, PGW, HSS, and the like. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

While FIG. 1 depicts components of a 5G RAN and a 5G core network, the described embodiments for UE power control for multiple UL carriers apply to other types of communication networks, including IEEE 802.11 variants, UMTS, LTE variants, CDMA 2000, Bluetooth, and the like. For example, in an LTE/EPC variant, the AMF 141 may be mapped to an MME, the SMF 143 may be mapped to a control plane portion of a PGW, the UPF 145 may be mapped to a SGW and a user plane portion of the PGW, etc.

The remote unit 105 may be configured for SUL operation. Moreover, the remote unit 105 may be configured with a maximum UE transmit power on a serving cell c and UL carrier f. In various embodiments, the remote unit 105 performs uplink transmission on one or both UL carriers 121, 123 using the determined transmit power value for the corresponding UL carrier. UL transmissions may include PUSCH, PUCCH, SRS, or PRACH transmissions.

In one embodiment, in a single-cell or carrier-aggregation operation, simultaneous transmissions (e.g., transmissions having the same or different starting time instance and/or length of the transmissions) may occur on different uplink carriers and/or serving cells, leading to partial or full overlap between different UL transmissions.

In various embodiments, the remote unit 105 may be configured with power headroom report type selection criteria based on a selection of one or a number of the following options:
  always report PHR Type-1;
  always report power headroom for a non-SUL carrier;
  always report power headroom for a SUL carrier;
  report power headroom based for an uplink carrier with PUCCH configuration, if present, and otherwise for the non-SUL carrier;
  report power headroom based for an uplink carrier with PUCCH configuration, if present, and otherwise for the SUL carrier;
  report for an uplink carrier that can report actual power headroom, if such an uplink carrier is present and unique, and otherwise report Type-1 PHR;
  report for an uplink carrier that can report actual power headroom, if such an uplink carrier is present and unique, and otherwise report power headroom for a non-SUL carrier;
  report for an uplink carrier that can report actual power headroom, if such an uplink carrier is present and unique, otherwise report power headroom for a SUL carrier;
  report for an uplink carrier that can report actual power headroom, if such an uplink carrier is present and unique, otherwise report power headroom for an uplink carrier with PUCCH configuration, if present, otherwise for the non-SUL carrier;
  report for an uplink carrier that can report actual power headroom, if such an uplink carrier is present and unique, otherwise report power headroom for an uplink carrier with PUCCH configuration, if present, otherwise for the SUL carrier;
  report power headroom based on a configured/predefined alternating pattern/rule in terms of a first number of Type-1 PHR followed by a second number of Type-3 PHR.

Figure 2:
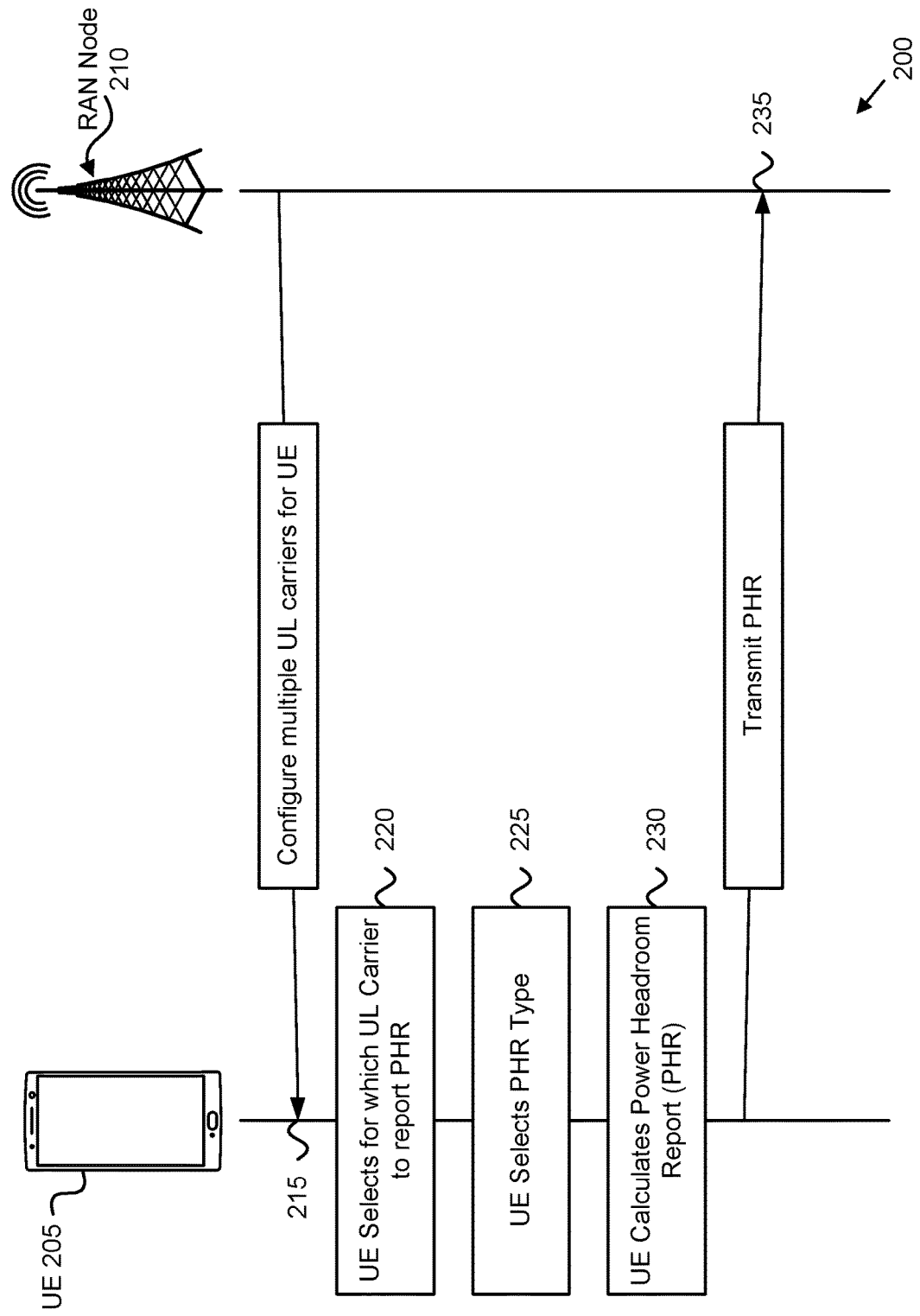
FIG. 2 is a diagram illustrating one embodiment of PH reporting for a UE configured with multiple uplink carriers.

FIG. 2 depicts one network architecture 200 for UE power control for multiple UL carriers, according to embodiments of the disclosure. The network architecture 200 includes a UE 205 and a RAN node 210. The UE 205 may be one embodiment of the remote unit 105, described above. The RAN node 210 (e.g., a gNB) may be one embodiment of the base unit 110, described above.

As depicted, the RAN node 210 may configure the UE 205 with multiple active UL carriers for a single serving cell (see messaging 215). In one embodiment, a first of the multiple configured UL carriers is the NUL carrier, while the second of the multiple configured UL carriers is the SUL carrier. During operation on NUL and SUL, the UE 205 may have UL transmissions scheduled on different UL carriers that overlap in time. In various embodiments, the UE 205 indicates its capability for simultaneous (e.g., time-overlapping) transmission of PUSCH, PUCCH, SRS and/or PRACH on a first uplink carrier of a serving cell and SRS on a second uplink carrier of the serving cell.

In response to a PHR trigger, the UE 205 may select for which UL carrier to report PH for the serving cell (see block 220) and selects a PHR type (see block 225). Based on the selections, the UE 205 calculates a power headroom level (see block 230) and generates a PHR for the serving cell and transmits a PHR to the RAN node 210 (see signaling 235). Note that when the UE 205 is configured for Carrier-Aggregation ("CA") operation, then the UE 205 may report the PH level for the serving cell configured with multiple UL carriers using a UL carrier of a different serving cell. Various techniques for Carrier Selection and PHR Type Selection are described herein.

According to a first solution, when the UE 205 reports only one PHR for the serving cell, the UE 205 always reports an actual Type-1 PHR for PUSCH. The first solution applies when a UE 205 is configured with only one single serving cell with two uplink carriers, e.g., NUL and SUL carriers and when the UE 205 reports a UE capability (e.g., denoted by the UE capability parameter simultaneousTxSUL-NonSUL in 5G NR Rel-15) that indicates that the UE 205 supports simultaneous transmission of only SRS on one of NUL or SUL carrier and PUSCH/PUCCH/SRS/PRACH on the other UL carrier in the cell. In such embodiments, the UE 205 may receive a corresponding UE configuration of signals/channel on the two UL carriers of the serving cell. With the first solution, the UE 205 reports the actual Type-1 PHR because any PHR needs to be carried/multiplexed on an actual/scheduled PUSCH transmission due to the UE being configured with only one single serving cell.

Consequently, as only one UL carrier is to be scheduled for PUSCH (recall the UE 205 in only capable of transmitting SRS on one UL carrier if PUSCH is to be simultaneously transmitted on the other UL carrier), the UL carrier selection 220 according to the first solution comprises determining which UL is to transmit actual PUSCH and selecting that carrier. Because actual PUSCH is transmitted, the PHR type selection 225 according to the first solution comprises always selection actual Type-1 PHR.

According to a second solution, when the UE 205 reports only one PHR per serving cell, the UE 205 selects which UL carrier (i.e., NUL or SUL) should be used for PHR and correspondingly which type of PHR (i.e., PHR Type-1 for PUSCH or PHR Type-3 for SRS) to report based on at least one of the following options.

According to a first option of the second solution (referred to herein as "Alternative-1"), the PHR type selection criterion is configured to always report PHR Type-1, e.g., to report PHR Type-1 independently of respective configurations for the transmissions (e.g., PUSCH or SRS) on the first uplink carrier and the second uplink carrier. Such embodiments may be advantageous because PUSCH is configured on one UL carrier (e.g., the first carrier) of the serving cell. Here, the UL carrier selection is influenced by the PHR type for each UL carrier such that the UE 205 always selects a UL carrier that can report PHR Type-1. Note that in the Alternative-1, the UE 205 may select between actual PHR Type-1 or virtual PHR Type-1 according to whether the selected UL carrier has an actual PUSCH transmission or a reference PUSCH transmission.

Note that in some embodiments, PHR Type-1 is more important than PHR Type-3 for future scheduling. PHR Type-1 which is related to PUSCH-only transmission on a carrier, provides the power availability or amount of transmission power available at the UE to the network for uplink scheduling. The network uses this information to schedule an appropriate uplink data rate that the available transmission power can support for future transmissions. PHR Type-3 which is related to SRS transmission on a carrier where the UE is not configured to transmit PUSCH. The SRS can be used for downlink CSI (Channel State Information) estimation (in addition to other DL CSI related feedback from the UE) and to evaluate uplink quality of alternative uplink carries that may be better suited for uplink (PUSCH/PUCCH/SRS) transmission and, if deemed advantageous, (re)configure the UE to use this carrier for uplink transmission instead.

PUSCH transmission on a carrier that is configured to carry PUSCH can be considered to have higher impact on UE uplink perceived throughput than SRS on a carrier without PUSCH configured used for candidate uplink carrier evaluation/DL CSI estimation. Thus, PHR Type-1 is more important to the network than PHR Type-3, and thus the UE 205 prioritizes transmission of PHR Type-1 over PHR Type-3.

In a variant of Alternative-1, a UL carrier may be configured with both PUSCH and PUCCH, rather than PUSCH-only. Here, instead of selecting the UL carrier that can report PHR Type-1, the UE 205 may always select the UL carrier that can report PHR Type-2, which is for PUSCH+PUCCH transmission. PHR Type-2 power headroom reports the difference between the nominal UE maximum transmit power and the estimated power for PUSCH and PUCCH transmission. For Type-2 PH, actual transmission is actual PUSCH and/or actual PUCCH transmission, while reference transmission is reference PUSCH and reference PUCCH transmission.

According to a second option of the second solution (referred to herein as "Alternative 2"), the UE 205 may determine whether to report PHR Type-1 or Type-3 according to a UL carrier selection. In this option, the UE 205 may select the UL carrier without considering the PHR type for the UL carrier. After UL carrier selection, the UE 205 identifies the appropriate PHR type for the selected carrier (e.g., PHR Type-1 vs PHR Type-3 and actual PHR vs virtual PHR).

In some embodiments of Alternative-2, the UE 205 is configured to select the UL carrier according to a UL carrier priority (referred to as "Alternative-2-1"). In Alternative-2-1, the UE 205 may be configured to report the PHR for the UL carrier on which PUCCH is configured (e.g., the first uplink carrier), otherwise (i.e., if none of the UL carriers are configured for PUCCH) then report for the non-SUL (a.k.a., NUL) carrier. In such embodiments, the PHR type (i.e., Type-1 vs. Type-3) is determined based on what channel or signal (i.e., PUSCH vs. SRS) is transmitted on the UL carrier.

In other embodiments, the UE 205 is configured to always report the PHR for a fixed UL carrier (referred to as "Alternative-2-2"), e.g., always report the PHR for the NUL carrier or always report the PHR for the SUL carrier. In Alternative-2-2, the PHR type (i.e., Type-1 vs. Type-3) is determined based on what channel/signal (i.e., PUSCH vs. SRS) is transmitted on the non-SUL (or alternatively, the SUL) carrier.

In a variant of Alternative-2, a UL carrier may be configured with both PUSCH and PUCCH, rather than PUSCH-only. Here, instead of selecting between PHR Type-1 and PHR Type-3, the UE 205 determines whether the selected UL can report PHR Type-2 or PHR Type-3.

According to a third option of the second solution (referred to herein as "Alternative-3"), the UE 205 may select an UL carrier according to which UL carrier will lead to an actual PHR report. After UL carrier selection, the UE 205 identifies the appropriate PHR type for the selected carrier (e.g., PHR Type-1 vs PHR Type-3). Different cases or scenarios for UL carrier selection according to Alternative-3 are described below.

According to Case-A, the UE 205 determines that both UL carriers (e.g., the first uplink carrier and the second uplink carrier) can report actual PHR. Note that this determination is based on a PHR "cut-off" time described below. Because in Case-A both UL carriers will lead to an actual PHR report, the UE 205 uses other criteria to select the UL carrier to use for reporting PH for the serving cell. In various embodiments, the UE 205 selects the UL carrier in Case-A according to the factors described above in Alternative-1, Alternative-2-1, or Alternative-2-2 as the fallback selection process.

According to Case-B, the UE determines that only one of the UL carriers can report actual PHR. Again, this determination is based on a PHR "cut-off" time described below. Because in Case-B only one UL carrier will lead to an actual PHR report, the UE 205 is configured to report the power headroom report for the UL carrier that can report actual PHR. In such embodiments, the PHR type (i.e., actual PHR Type-1 vs. actual PHR Type-3) is based on what channel/signal (i.e., PUSCH vs. SRS) is transmitted on that UL carrier.

According to Case-C, the UE 205 determines that none of UL carriers (e.g., neither the first uplink carrier nor the second uplink carrier) can report actual PHR. Again, this determination is based on a PHR "cut-off" time described below. Because in Case-C neither UL carrier will lead to an actual PHR report, the UE 205 uses other criteria to select the UL carrier to use for reporting PH for the serving cell. In various embodiments, the UE 205 selects the UL carrier in Case-C according to the factors described above in Alternative-1, Alternative-2-1, or Alternative-2-2 as the fallback selection process.

In the above, the term PHR "cut-off" time is a specific time instance/reference such that transmission whose scheduling information are known (e.g., received and processed) before the PHR cut-off time will report actual PHR, and transmissions whose scheduling information are known (e.g., received and processed) after the PHR cut-off time (or if there is no transmission at all on a serving cell/carrier) will report virtual PHR. In one embodiment, the PHR cut-off time is configured by the RAN node 210. In another embodiment, the PHR cut-off time is defined in a communication standard defining the RAT used by the RAN node 210 (e.g., specified in the 3GPP standards).

In one example, the Alternative-3 may be implemented by the UE 205 selecting the UL carrier according to the following "PHR priority order": actual PHR Type-1 has highest priority, actual PHR Type-3 has second highest priority, virtual PHR Type-1 has third highest priority and virtual PHR Type-3 has fourth highest priority. In such embodiments, from a future scheduling perspective, it may be better to prioritize actual PHR over virtual PHR. Here, for Case-A (both UL carriers can report actual PHR) and for Case-C (neither UL carrier can report actual PHR), the UE 205 may be configured to follow Alternative-1 (e.g., select UL carrier that can report PHR Type-1) as the fallback selection process.

In a variant of Alternative-3, a UL carrier may be configured with both PUSCH and PUCCH, rather than PUSCH-only. Here, instead of selecting between PHR Type-1 and PHR Type-3, the UE 205 determines whether the selected UL can report PHR Type-2 or PHR Type-3.

According to a fourth option of the second solution (referred to as "Alternative-4"), the UE 205 selects the power headroom report type (e.g., Type-1 or Type-3) according to a configured/predefined alternating pattern/rule. For example, in certain embodiments the UE 205 may report a first number of PHR Type-1 followed by a second number of PHR Type-3, e.g., one PHR Type-1 followed by one PHR Type-3 (i.e., for one PHR trigger, PHR Type-1 is reported and for the next PHR trigger, PHR Type-3 is reported) or e.g., two PHR Type-1 followed by one PHR Type-3, etc. In such embodiments, diversity in PHR types is facilitated. Here, the UL carrier selection 220 is according to whichever UL carrier can report the PHR specified by the pattern. After UL carrier selection, the UE 205 identifies the appropriate PHR type for the selected carrier (e.g., actual PHR vs virtual PHR).

In a variant of Alternative-4, a UL carrier may be configured with both PUSCH and PUCCH, rather than PUSCH-only. Here, instead of the alternating pattern pertaining to PHR Type-1 and PHR Type-3, the alternating pattern pertains to PHR Type-2 or PHR Type-3. In a further variant, the pattern may alternate between PHR Type-1, PHR Type-2, and PHR Type-3.

The second solution applies when a UE is configured for CA operation with a number of serving cells, among which there is at least one serving cell with two uplink carriers configured to the UE, namely, NUL and SUL carriers, and when the UE reports a UE capability (e.g., denoted by the UE capability parameter simultaneousTxSUL-NonSUL in 5G NR Rel-15) that indicates whether UE supports simultaneous transmission of only SRS on one of NUL or SUL carrier of that serving cell and PUSCH/PUCCH/SRS/PRACH on the other UL carrier in the same serving cell. Again, the UE 205 may receive a corresponding UE configuration of signals/channel on the two UL carriers of the serving cell. In certain embodiments, the actual selection from among the above defined options or a subset thereof can be predefined in the specification of UE behavior, or can be configured by the network.

Figure 3:
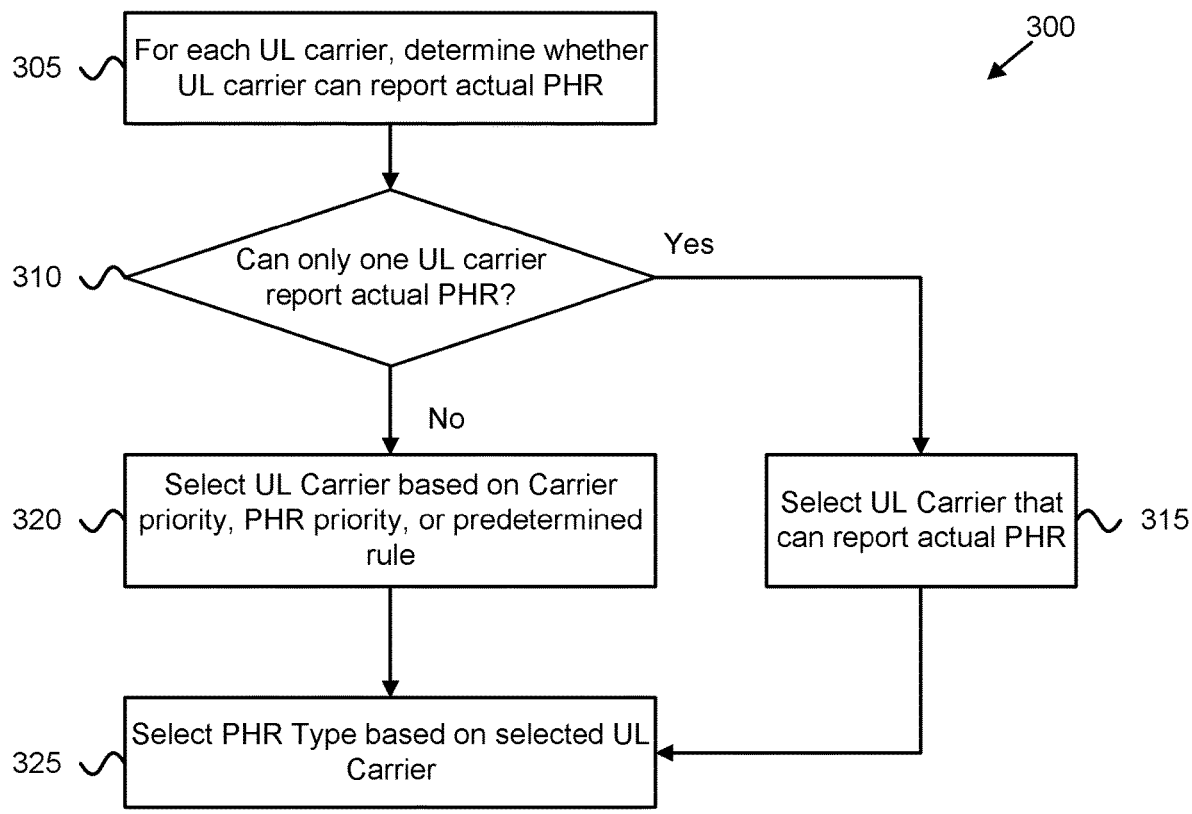
FIG. 3 is a diagram illustrating one embodiment of PH reporting process for a UE configured with multiple uplink carriers.

FIG. 3 depicts a procedure 300 for PHR generation by a UE configured with multiple uplink carriers on a serving cell, according to embodiments of the disclosure. The procedure 300 may be performed by a UE, such as the remote unit 105 and/or the UE 205. Here, the UE is configured with multiple uplink carriers for at least one serving cell. In certain embodiments, the UE performs the procedure 300 in response to receiving a PHR trigger.

The procedure 300 begins as the UE determines, for each configured UL carrier of the serving cell, whether the UL carrier can report an actual PHR (see block 305). If only one configured UL carrier of the serving cell is able to report actual PHR (see block 310), then the UE selects the UL carrier that can report actual PHR for reporting PHR for the serving cell (see block 315). Otherwise, if no configured UL carrier of the serving cell is able to report actual PHR or if more than one (e.g., both) configured UL carrier of the serving cell is able to report actual PHR, then the UE select the UL carrier using fallback selection criteria, such as carrier priority, PHR priority, or a predetermined selection rule (see block 320). Examples of fallback selection process for block 320 include Alternative-1, Alternative-2-1, and Alternative-2-2.

After selecting the UL carrier, the procedure 300 continues with UE selecting a PHR type (e.g., Type-1, Type-2, or Type-3) for the selected UL carrier based on what channel/signal (i.e., PUSCH vs. PUSCH+PUCCH vs. SRS) is transmitted on the selected UL carrier (see block 325). If the selected UL carrier is unable to report actual PHR, then the PHR will be a virtual PHR. The procedure 300 ends.

In some embodiments, a PHR is triggered in the UE when phr-ProhibitTimer expires or has expired and the pathloss has changed more than phr-Tx-PowerFactorChange [in dB] since the last transmission of a PHR for at least uplink carrier of a serving cell of any MAC entity which is used as a pathloss reference. In some embodiments, the PHR triggering condition is based on pathloss change with reference to the parameter dl-PathlossChange.

Figure 4:
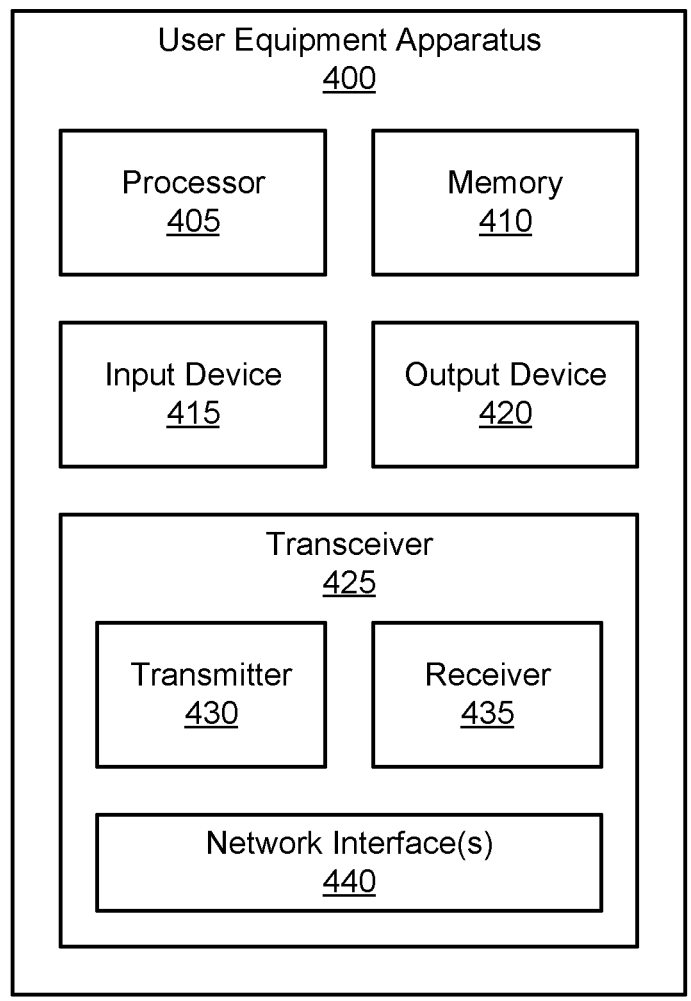
FIG. 4 is a block diagram illustrating a user equipment apparatus for reporting power headroom for a serving cell configured with multiple uplink carriers.

FIG. 4 depicts one embodiment of a user equipment apparatus 400 that may be used for reporting a power headroom report for supplementary uplink operation. The user equipment apparatus 400 may be one embodiment of the remote unit 105. Furthermore, the user equipment apparatus 400 may include a processor 405, a memory 410, an input device 415, an output device 420, and a transceiver 425. In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of the processor 405, the memory 410, and the transceiver 425, and may not include the input device 415 and/or the output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the transceiver 425 receives a configuration of a first uplink carrier and a second uplink carrier for a serving cell, wherein the first uplink carrier and the second uplink carrier are different. In some embodiments, the first uplink carrier comprises a non-supplementary uplink carrier ("NUL") and the second uplink carrier comprises a supplementary uplink ("SUL") carrier. In other embodiments, the second uplink carrier comprises a non-supplementary uplink carrier ("NUL") and the first uplink carrier comprises a supplementary uplink ("SUL") carrier.

In some embodiments, the processor 405 determines whether a first power headroom for the first uplink carrier is to be based on an actual first transmission or a reference first transmission on the first uplink carrier. The processor 405 also determines whether a second power headroom for the second uplink carrier is to be based on an actual second transmission or a reference second transmission on the second uplink carrier. In certain embodiments, the processor 405 determines the first power headroom for the first uplink carrier and the second power headroom for the second uplink carrier in response to receiving a power headroom trigger.

In some embodiments, the first power headroom is to be based on an actual first transmission and the second power headroom is to be based on a reference second transmission. In such embodiments, the processor 405 reports a power headroom report for the serving cell comprising the first power headroom based on the actual first transmission on the first uplink carrier of the serving cell.

In some embodiments, the first power headroom is to be based on a reference first transmission and the second power headroom is to be based on an actual second transmission. In such embodiments, the processor 405 reports a power headroom report for the serving cell comprising the second power headroom based on the actual second transmission on the second uplink carrier of the serving cell.

In some embodiments, the first and second power headrooms are to be based on actual transmissions. Moreover, the actual first transmission may be an actual PUSCH transmission on the first uplink carrier and the actual second transmission may be an actual SRS transmission on the second uplink carrier. In such embodiments, the processor reports a power headroom report for the serving cell comprising the first power headroom based on the actual PUSCH transmission on the first uplink carrier of the serving cell.

In some embodiments, the first and second power headrooms are to be based on reference transmissions. Moreover, the reference first transmission may be a reference PUSCH transmission on the first uplink carrier and the reference second transmission may be a reference SRS transmission on the second uplink carrier. In such embodiments, processor reports a power headroom report for the serving cell comprising the first power headroom based on the reference PUSCH transmission on the first uplink carrier of the serving cell.

Where the first transmission includes a PUSCH transmission, then the first power headroom may comprise a Type-1 power headroom. Where the first transmission includes a SRS transmission, then the first power headroom may comprise a Type-3 power headroom. Where the second transmission includes a PUSCH transmission, then the second power headroom may comprise a Type-1 power headroom. Where the second transmission includes a SRS transmission, then the second power headroom may comprise a Type-3 power headroom.

In some embodiments, the processor 405 operates the user equipment apparatus 400 with carrier aggregation on the first serving cell and a second serving cell. In such embodiments, the processor 405 may report a power headroom report comprising the first power headroom for the first serving cell on a PUSCH resource of the second serving cell. Alternatively, the processor 405 may report a power headroom report comprising the second power headroom for the first serving cell on a PUSCH resource of the second serving cell.

In certain embodiments, the processor 405 controls the transceiver 425 to send a capability parameter to the network. Here, the capability parameter indicates whether the user equipment apparatus 400 supports simultaneous transmission of 1) SRS on one of the first uplink carrier and the second uplink carrier of the serving cell and 2) one of a PUSCH, PUCCH and SRS on the other of the first uplink carrier and the second uplink carrier in the serving cell.

In certain embodiments, the first transmission comprises a PUSCH and PUCCH transmission and the first power headroom comprises a Type-2 power headroom, and the second transmission comprises an SRS transmission and the second power headroom comprises a Type-3 power headroom. In other embodiments, the first transmission comprises an SRS transmission and the first power headroom comprises a Type-3 power headroom, and the second transmission comprises a PUSCH and PUCCH transmission and the second power headroom comprises a Type-2 power headroom.

In various embodiments, the transceiver 425 sends a message indicating a capability for simultaneous or overlapping transmission of PUSCH on a first uplink carrier of a serving cell and SRS on a second uplink carrier of the serving cell. The processor 405 receives a configuration for PUSCH power control parameters on the first uplink carrier of the serving cell and a configuration for SRS power control parameters on the second uplink carrier of the serving cell and receives a PHR trigger. The processor 405 determines a PHR type for the serving cell based on the PHR trigger and a PHR type selection criterion and reports a PHR for the serving cell corresponding to an uplink carrier that is associated with the determined PHR type based on corresponding power control parameters.

In some embodiments, the PHR type selection criterion is configured to report PHR Type-1 independently of respective configurations for the transmissions on the first uplink carrier and the second uplink carrier.

In certain embodiments, the processor 405 identifies an uplink carrier of the first and second uplink carriers for which PUCCH is configured. In such embodiments, the processor 405 reports the PHR by sending the PHR for the identified uplink carrier for which PUCCH is configured, and sending the PHR for a NUL carrier in response to neither the first uplink carrier nor the second uplink carrier being configured for PUCCH, the NUL carrier being one of the first and second uplink carriers.

In certain embodiments, the processor 405 identifies an uplink carrier of the first and second uplink carriers for which PUCCH is configured. In such embodiments, the processor 405 reports the PHR by sending the PHR for the identified uplink carrier for which PUCCH is configured, and sending the PHR for a SUL carrier in response to neither the first uplink carrier nor the second uplink carrier being configured for PUCCH, the SUL carrier being one of the first and second uplink carriers.

In some embodiments, the processor 405 reports the PHR by sending the PHR for a NUL carrier, wherein the NUL carrier is one of the first and second uplink carriers. In such embodiments, the PHR type is Type-1 in response to PUSCH transmission on the NUL carrier and the PHR type is Type-3 in response SRS transmission on to the NUL carrier. In other embodiments, the processor 405 reports the PHR by sending the PHR for a SUL carrier, wherein the SUL carrier is one of the first and second uplink carriers. In such embodiments, the PHR type is Type-1 in response to PUSCH transmission on the SUL carrier and the PHR type is Type-3 in response to SRS transmission on the SUL carrier.

In some embodiments, the processor 405 determines whether the PHR for the first uplink carrier is an actual PHR and determining whether the PHR for the second uplink carrier is an actual PHR. In such embodiments, the processor 405 selects a reporting carrier from the first uplink carrier and the second uplink carrier based on the determinations.

In certain embodiments, only one of the PHR for the first and second uplink carriers is an actual PHR. In such embodiments, the processor 405 selects the uplink carrier associated with an actual PHR, wherein a Type-1 PHR is selected in response to PUSCH being transmitted on the reporting carrier, and wherein a Type-3 PHR is selected in response to SRS being transmitted on the reporting carrier.

In certain embodiments, both of the PHR for the first and second uplink carriers are an actual PHR. In such embodiments, the processor 405 selects one of the first and second uplink carriers using fallback criteria. As an example, the processor 405 may select the uplink carrier associated with an PHR corresponding to a PUSCH transmission, wherein the PHR comprises a Type-1 PHR. In one embodiment, the selected uplink carrier is associated with an PHR corresponding to a reference PUSCH transmission, wherein the PHR comprises a virtual Type-1 PHR.

In some embodiments, the processor 405 reports power headroom based on a predefined alternating rule comprising a first number of Type-1 PHR followed by a second number of Type-3 PHR.

In certain embodiments, the PHR type selection criterion is configured to report PHR Type-2 independently of respective configurations for the transmissions on the first uplink carrier and the second uplink carrier. In certain embodiments, the PHR type selection criterion is configured to report one of PHR Type-2 and PHR Type-3 based on a transmission type of a reporting uplink carrier. In certain embodiments, the PHR type selection criterion is configured to report one of PHR Type-2 and PHR Type-3 based on PHR priority order for a reporting uplink carrier.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to reporting power headroom for a serving cell configured with multiple uplink carriers, for example storing a PHR, priority lists, UL carrier configurations, and the like. In certain embodiments, the memory 410 also stores program code and related data, such as an operating system ("OS") or other controller algorithms operating on the user equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

As discussed above, the transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 may include one or more transmitters 430 and one or more receivers 435. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. Additionally, the transceiver 425 may support at least one network interface 440. Here, the at least one network interface 440 facilitates communication with a RAN node, such as an eNB or gNB, for example using the "Uu" interface. Additionally, the at least one network interface 440 may include an interface used for communications with one or more network functions in the mobile core network, such as a UPF, an AMF, and/or a SMF.

In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an application-specific integrated circuit ("ASIC"), or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
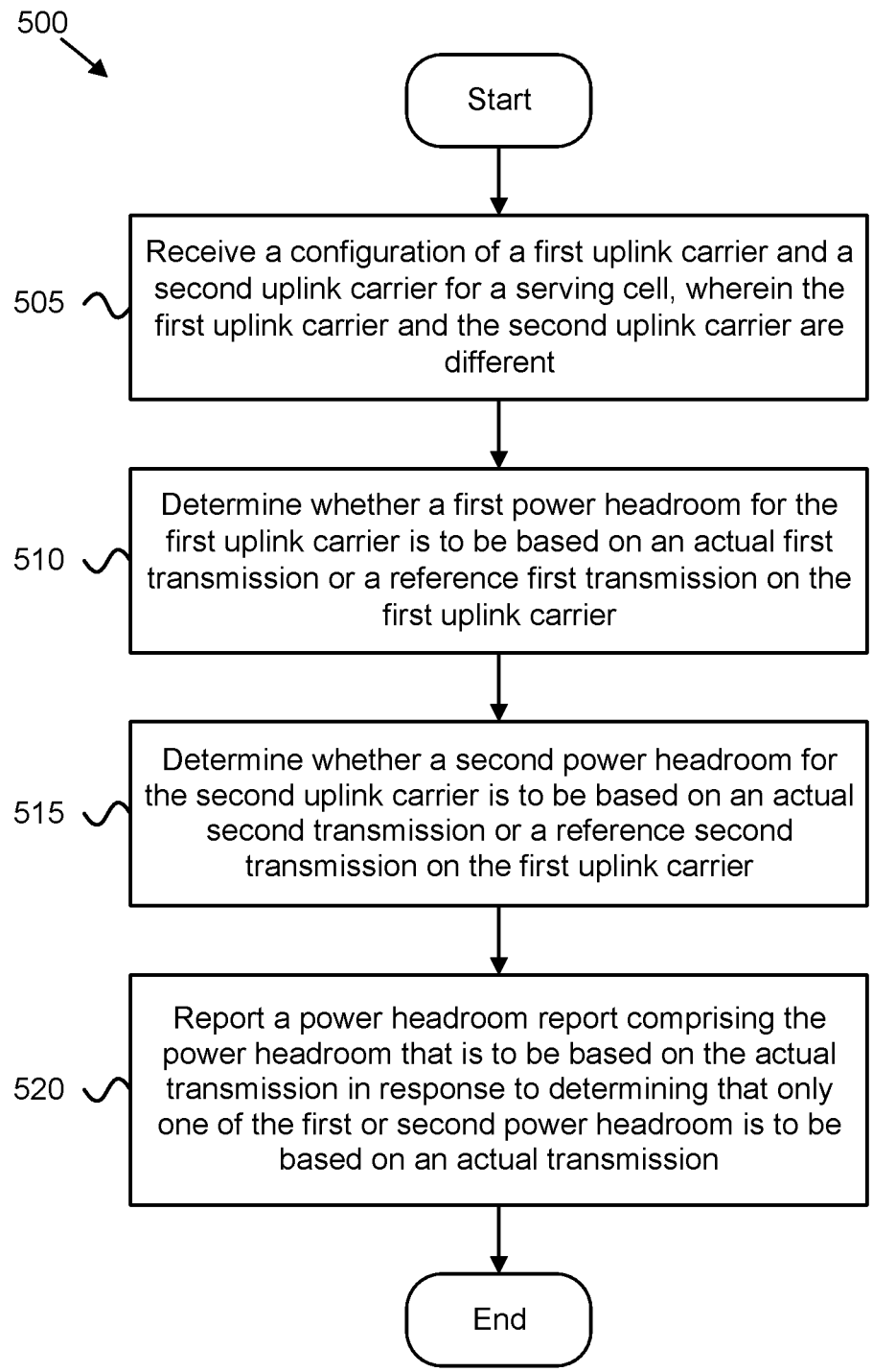
FIG. 5 is a flow chart diagram illustrating one method of reporting power headroom for a serving cell configured with multiple uplink carriers.

FIG. 5 is a schematic flow chart diagram illustrating one embodiment of a method 500 for UE power control for multiple UL carriers, according to embodiments of the disclosure. In some embodiments, the method 500 is performed by a UE, such as the remote unit 105, the UE 205, and/or the user equipment apparatus 400. In certain embodiments, the method 500 may be performed by a processor executing program code, for example, a microcontroller, a microprocessor, a CPU, a GPU, an auxiliary processing unit, a FPGA, or the like.

The method 500 begins and receives 505 a configuration of a first uplink carrier and a second uplink carrier for a serving cell. Here the first uplink carrier and the second uplink carrier are different. In certain embodiments, the first uplink carrier comprises a non-supplementary uplink carrier and the second uplink carrier comprises a supplementary uplink carrier. In other embodiments, the second uplink carrier comprises a non-supplementary uplink carrier ("NUL") and the first uplink carrier comprises a supplementary uplink ("SUL") carrier.

The method 500 includes determining 510 whether a first power headroom for the first uplink carrier is to be based on an actual first transmission or a reference first transmission on the first uplink carrier. In some embodiments, the first transmission comprises a PUSCH transmission and the first power headroom comprises a Type-1 power headroom. In certain embodiments, the first transmission comprises a PUSCH and PUCCH transmission and the first power headroom comprises a Type-2 power headroom. In other embodiments, the first transmission comprises a SRS transmission and the first power headroom comprises a Type-3 power headroom.

The method 500 includes determining 515 whether a second power headroom for the second uplink carrier is to be based on an actual second transmission or a reference second transmission on the second uplink carrier. In some embodiments, the second transmission comprises a PUSCH transmission and the second power headroom comprises a Type-1 power headroom. In certain embodiments, the second transmission comprises a PUSCH and PUCCH transmission and the second power headroom comprises a Type-2 power headroom. In other embodiments, the second transmission comprises a SRS transmission and the second power headroom comprises a Type-3 power headroom.

The method 500 includes reporting 520 a power headroom report comprising the power headroom that is to be based on the actual transmission in response to determining that only one of the first or second power headroom is to be based on an actual transmission. The method 500 ends.

In one embodiment, reporting 520 the power headroom comprises reporting a power headroom report for the serving cell comprising the first power headroom based on an actual first transmission on the first uplink carrier of the serving cell in response to determining that the first power headroom is to be based on the actual first transmission and the second power headroom is to be based on a reference second transmission. In another embodiment, reporting 520 the power headroom comprises reporting a power headroom report for the serving cell comprising the second power headroom based on an actual second transmission on the second uplink carrier of the serving cell in response to determining that the first power headroom is to be based on a reference first transmission and the second power headroom is to be based on the actual second transmission.

In one embodiment, reporting 520 the power headroom comprises reporting a power headroom report for the serving cell comprising the first power headroom based on an actual PUSCH transmission on the first uplink carrier of the serving cell in response to determining that the first power headroom is to be based on an actual first transmission and the second power headroom is to be based on an actual second transmission, wherein the actual first transmission is the actual PUSCH transmission on the first uplink carrier and the actual second transmission is an actual SRS transmission on the second uplink carrier.

In one embodiment, reporting 520 the power headroom comprises reporting a power headroom report for the serving cell comprising the first power headroom based on a reference PUSCH transmission on the first uplink carrier of the serving cell in response to determining that the first power headroom is to be based on a reference first transmission and the second power headroom is to be based on a reference second transmission, wherein the reference first transmission is the reference PUSCH transmission on the first uplink carrier and the reference second transmission is a reference SRS transmission on the second uplink carrier.

Figure 6:
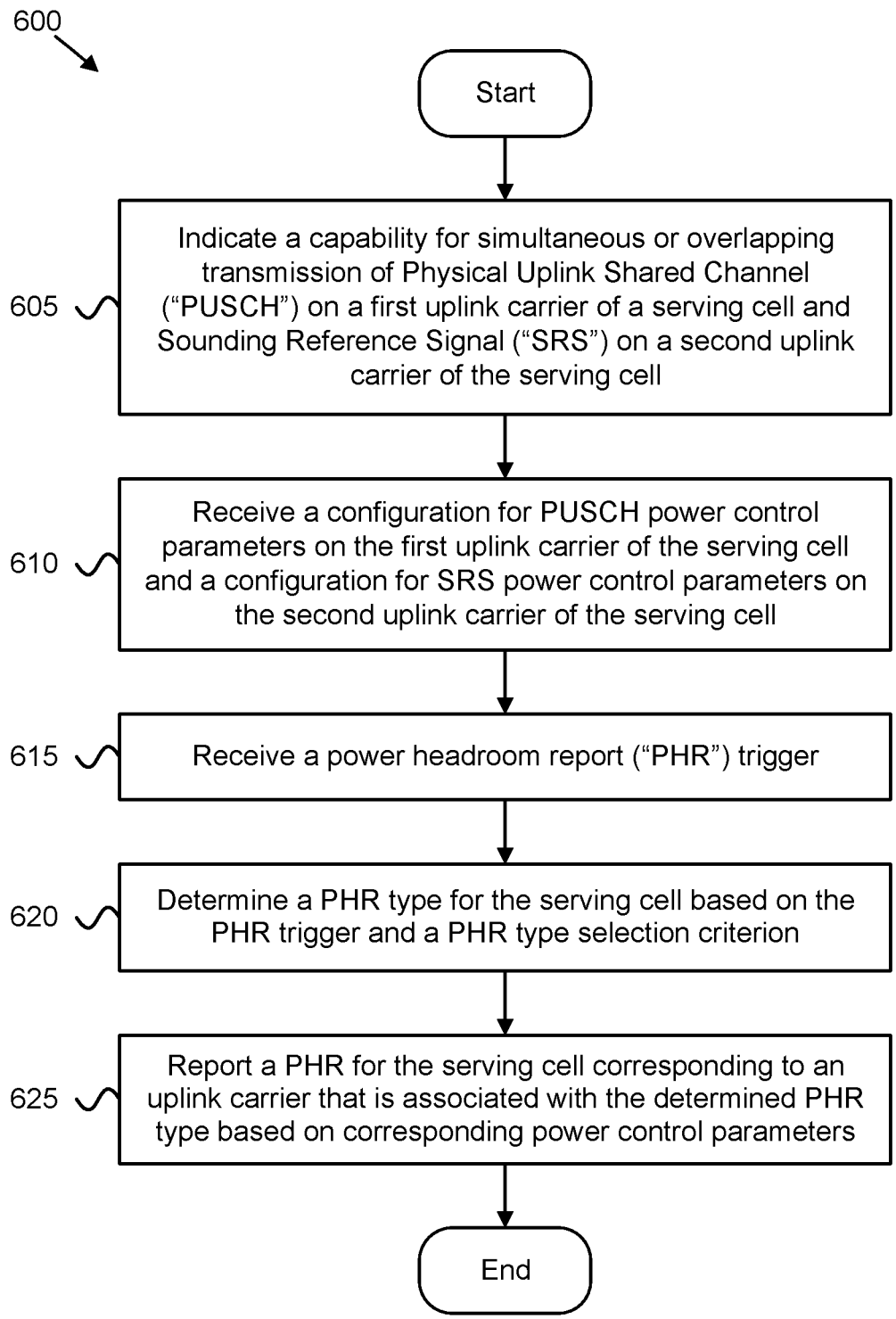
FIG. 6 is a flow chart diagram illustrating another method of reporting power headroom for a serving cell configured with multiple uplink carriers.

FIG. 6 is a schematic flow chart diagram illustrating one embodiment of a method 600 for UE power control for multiple UL carriers, according to embodiments of the disclosure. In some embodiments, the method 600 is performed by a UE, such as the remote unit 105, the UE 205, and/or the user equipment apparatus 400. In certain embodiments, the method 600 may be performed by a processor executing program code, for example, a microcontroller, a microprocessor, a CPU, a GPU, an auxiliary processing unit, a FPGA, or the like.

The method 600 begins and indicates 605 a capability for simultaneous or overlapping transmission of PUSCH on a first uplink carrier of a serving cell and SRS on a second uplink carrier of the serving cell.

The method 600 includes receiving 610 a configuration for PUSCH power control parameters on the first uplink carrier of the serving cell and a configuration for SRS power control parameters on the second uplink carrier of the serving cell. In certain embodiments, the first uplink carrier comprises a non-supplementary uplink carrier and the second uplink carrier comprises a supplementary uplink carrier. In other embodiments, the first uplink carrier comprises a supplementary uplink carrier and the second uplink carrier comprises a non-supplementary uplink carrier.

The method 600 includes receiving 615 a PHR trigger. The method 600 includes determining 620 a PHR type for the serving cell based on the PHR trigger and a PHR type selection criterion.

The method 600 includes reporting 625 a PHR for the serving cell corresponding to an uplink carrier that is associated with the determined PHR type based on corresponding power control parameters. The method 600 ends.

Disclosed herein is a first apparatus for generating a power headroom report for a serving cell configured with multiple uplink carriers, according to embodiments of the disclosure. The first apparatus may be implemented by a UE, such as the remote unit 105, the UE 205 and/or the user equipment apparatus 400. The first apparatus includes a processor and a transceiver that receives a configuration of a first uplink carrier and a second uplink carrier for a serving cell. Here, the first uplink carrier and the second uplink carrier are different. The processor determines a basis for a first power headroom for the first uplink carrier, the basis selected from an actual first transmission on the first uplink carrier and a reference first transmission on the first uplink carrier. The processor determines a basis for a second power headroom for the second uplink carrier, the basis selected from an actual second transmission on the second uplink carrier and a reference second transmission on the second uplink carrier.

The processor controls the transceiver to report a power headroom report for the serving cell comprising the first power headroom based on an actual first transmission on the first uplink carrier of the serving cell in response to determining that the first power headroom is to be based on the actual first transmission and the second power headroom is to be based on a reference second transmission. The processor controls the transceiver to report a power headroom report for the serving cell comprising the second power headroom based on an actual second transmission on the second uplink carrier of the serving cell in response to determining that the first power headroom is to be based on a reference first transmission and the second power headroom is to be based on the actual second transmission.

In some embodiments, the processor reports a power headroom report for the serving cell comprising the first power headroom based on an actual PUSCH transmission on the first uplink carrier of the serving cell in response to determining that the first power headroom is to be based on an actual first transmission and the second power headroom is to be based on an actual second transmission, wherein the actual first transmission is the actual PUSCH transmission on the first uplink carrier and the actual second transmission is an actual SRS transmission on the second uplink carrier.

In some embodiments, the processor reports a power headroom report for the serving cell comprising the first power headroom based on a reference PUSCH transmission on the first uplink carrier of the serving cell in response to determining that the first power headroom is to be based on a reference first transmission and the second power headroom is to be based on a reference second transmission, wherein the reference first transmission is a reference PUSCH transmission on the first uplink carrier and the reference second transmission is a reference SRS transmission on the second uplink carrier.

In certain embodiments, the first transmission comprises a PUSCH transmission and the first power headroom comprises a Type-1 power headroom, and the second transmission comprises a SRS transmission and the second power headroom comprises a Type-3 power headroom. In other embodiments, the first transmission comprises a SRS transmission and the first power headroom comprises a Type-3 power headroom, and the second transmission comprises a PUSCH transmission and the second power headroom comprises a Type-1 power headroom.

In certain embodiments, the first transmission comprises a PUSCH and PUCCH transmission and the first power headroom comprises a Type-2 power headroom, and the second transmission comprises a SRS transmission and the second power headroom comprises a Type-3 power headroom. In other embodiments, the first transmission comprises a SRS transmission and the first power headroom comprises a Type-3 power headroom, and the second transmission comprises a PUSCH and PUCCH transmission and the second power headroom comprises a Type-2 power headroom.

In certain embodiments, the first uplink carrier comprises a non-supplementary uplink carrier and the second uplink carrier comprises a supplementary uplink carrier. In other embodiments, the first uplink carrier comprises a supplementary uplink carrier and the second uplink carrier comprises a non-supplementary uplink carrier. In some embodiments, the processor sends a capability parameter that indicates whether the apparatus supports simultaneous transmission of SRS on one of the first uplink carrier and the second uplink carrier of the serving cell and one of a PUSCH, PUCCH and SRS on the other of the first uplink carrier and the second uplink carrier in the serving cell.

In some embodiments, the serving cell is a first serving cell, wherein the processor further operates the first apparatus with carrier aggregation on the first serving cell and a second serving cell, and reports a power headroom report for the first serving cell on a PUSCH resource of the second serving cell. In such embodiments, the power headroom report for the first serving cell may be either the first power headroom for the first uplink carrier or the second power headroom for the second uplink carrier according to the selection criteria described herein. In some embodiments, the processor determines the first power headroom for the first uplink carrier and the second power headroom for the second uplink carrier in response to receiving a power headroom trigger.

Disclosed herein is a second apparatus for generating a power headroom report for a serving cell configured with multiple uplink carriers, according to embodiments of the disclosure. The second apparatus may be implemented by a UE, such as the remote unit 105, the UE 205 and/or the user equipment apparatus 400. The second apparatus includes a processor and a transceiver that receives a configuration of a first uplink carrier and a second uplink carrier for a serving cell. Here, the first uplink carrier and the second uplink carrier are different. The processor determines a basis for a first power headroom for the first uplink carrier and for a second power headroom for the second uplink carrier. Here, each power headroom may be based on either an actual transmission or on a reference transmission. In response to determining that only one of the first and second power headroom is to be based on an actual transmission, the processor controls the transceiver to send a power headroom report comprising the power headroom that is to be based on the actual transmission.

In one embodiment, the processor reports a power headroom report for the serving cell comprising the first power headroom based on an actual first transmission on the first uplink carrier of the serving cell in response to determining that the first power headroom is to be based on the actual first transmission and the second power headroom is to be based on a reference second transmission. In another embodiment, the processor reports a power headroom report for the serving cell comprising the second power headroom based on an actual second transmission on the second uplink carrier of the serving cell in response to determining that the first power headroom is to be based on a reference first transmission and the second power headroom is to be based on the actual second transmission.

In one embodiment, the processor reports a power headroom report for the serving cell comprising the first power headroom based on an actual PUSCH transmission on the first uplink carrier of the serving cell in response to determining that the first power headroom is to be based on an actual first transmission and the second power headroom is to be based on an actual second transmission, wherein the actual first transmission is the actual PUSCH transmission on the first uplink carrier and the actual second transmission is an actual SRS transmission on the second uplink carrier.

In one embodiment, the processor reports a power headroom report for the serving cell comprising the first power headroom based on a reference PUSCH transmission on the first uplink carrier of the serving cell in response to determining that the first power headroom is to be based on a reference first transmission and the second power headroom is to be based on a reference second transmission, wherein the reference first transmission is the reference PUSCH transmission on the first uplink carrier and the reference second transmission is a reference SRS transmission on the second uplink carrier.

Disclosed herein is a third apparatus for generating a power headroom report for a serving cell configured with multiple uplink carriers, according to embodiments of the disclosure. The third apparatus may be implemented by a UE, such as the remote unit 105, the ULE 205 and/or the user equipment apparatus 400. The third apparatus includes a processor and a transceiver that sends a message indicating a capability for simultaneous or overlapping transmission of Physical Uplink Shared Channel ("PUSCH") on a first uplink carrier of a serving cell and Sounding Reference Signal ("SRS") on a second uplink carrier of the serving cell. The processor receives a configuration for PUSCH power control parameters on the first uplink carrier of the serving cell and a configuration for SRS power control parameters on the second uplink carrier of the serving cell and receives a power headroom report ("PHR") trigger. The processor determines a PHR type for the serving cell based on the PHR trigger and a PHR type selection criterion and reports a PHR for the serving cell corresponding to an uplink carrier that is associated with the determined PHR type based on corresponding power control parameters.

In some embodiments, the PHR type selection criterion is configured to report PHR Type-1 independently of respective configurations for the transmissions on the first uplink carrier and the second uplink carrier.

In certain embodiments, the processor identifies an uplink carrier of the first and second uplink carriers for which PUCCH is configured. In such embodiments, reporting the PHR comprises sending the PHR for the identified uplink carrier for which PUCCH is configured, and reporting the PHR comprises sending the PHR for a non-supplementary uplink ("non-SUL") carrier in response to neither the first uplink carrier nor the second uplink carrier being configured for PUCCH, the non-SUL carrier being one of the first and second uplink carriers.

In certain embodiments, the processor identifies an uplink carrier of the first and second uplink carriers for which PUCCH is configured. In such embodiments, reporting the PHR comprises sending the PHR for the identified uplink carrier for which PUCCH is configured, and reporting the PHR comprises sending the PHR for a supplementary uplink ("SUL") carrier in response to neither the first uplink carrier nor the second uplink carrier being configured for PUCCH, the SUL carrier being one of the first and second uplink carriers.

In some embodiments, reporting the PHR comprises sending the PHR for a non-SUL carrier, where the non-SUL carrier is either the first uplink carrier or the second uplink carrier. In such embodiments, the PHR type is Type-1 in response to PUSCH transmission on the non-SUL carrier and the PHR type is Type-3 in response SRS transmission on to the non-SUL carrier.

In some embodiments, reporting the PHR comprises sending the PHR for a SUL carrier, wherein the SUL carrier is one of the first and second uplink carriers. In such embodiments, the PHR type is Type-1 in response to PUSCH transmission on the SUL carrier and the PHR type is Type-3 in response to SRS transmission on the SUL carrier.

In some embodiments, the processor determines whether the PHR for the first uplink carrier is an actual PHR and determining whether the PHR for the second uplink carrier is an actual PHR. In such embodiments, the processor selects a reporting carrier from the first uplink carrier and the second uplink carrier based on the determinations.

In certain embodiments, only one of the PHR for the first and second uplink carriers is an actual PHR. In such embodiments, selecting the reporting carrier comprises selecting the uplink carrier associated with an actual PHR, wherein a Type-1 PHR is selected in response to PUSCH being transmitted on the reporting carrier, and wherein a Type-3 PHR is selected in response to SRS being transmitted on the reporting carrier.

In certain embodiments, both of the PHR for the first and second uplink carriers are an actual PHR. In such embodiments, selecting the reporting carrier comprises further selecting based on carrier associated with an PHR corresponding to a PUSCH transmission, wherein a Type-1 PHR is selected in response to the PUSCH being transmitted on the reporting carrier.

In certain embodiments, none of the PHR for the first and second uplink carriers are actual PHR. In such embodiments, selecting the reporting carrier comprises further selecting based on carrier associated with an PHR corresponding to a reference PUSCH transmission, wherein a Type-1 PHR is selected in response to the reference PUSCH transmission on the reporting carrier.

In some embodiments, the PHR type selection criterion is configured to report power headroom based on a predefined alternating rule comprising a first number of Type-1 PHR followed by a second number of Type-3 PHR.

In certain embodiments, the PHR type selection criterion is configured to report PHR Type-2 independently of respective configurations for the transmissions on the first uplink carrier and the second uplink carrier. In certain embodiments, the PHR type selection criterion is configured to report one of PHR Type-2 and PHR Type-3 based on a transmission type of a reporting uplink carrier. In certain embodiments, the PHR type selection criterion is configured to report one of PHR Type-2 and PHR Type-3 based on PHR priority order for a reporting uplink carrier.

Disclosed herein is a first method for generating a power headroom report for a serving cell configured with multiple uplink carriers, according to embodiments of the disclosure. The first method may be performed by a UE, such as the remote unit 105, the UE 205 and/or the user equipment apparatus 400. The first method includes receiving a configuration of a first uplink carrier and a second uplink carrier for a serving cell. Here, the first uplink carrier and the second uplink carrier are different carriers of the serving cell. The first method includes determining whether a first power headroom for the first uplink carrier is to be based on an actual first transmission or a reference first transmission on the first uplink carrier and determining whether a second power headroom for the second uplink carrier is to be based on an actual second transmission or a reference second transmission on the second uplink carrier. The first method includes reporting a power headroom report for the serving cell comprising the first power headroom based on an actual first transmission on the first uplink carrier of the serving cell in response to determining that the first power headroom is to be based on the actual first transmission and the second power headroom is to be based on a reference second transmission.

In some embodiments, the power headroom report for the serving cell includes the second power headroom based on an actual second transmission on the second uplink carrier of the serving cell in response to determining that the first power headroom is to be based on a reference first transmission and the second power headroom is to be based on the actual second transmission.

In some embodiments, the power headroom report for the serving cell includes the first power headroom based on an actual PUSCH transmission on the first uplink carrier of the serving cell in response to determining that the first power headroom is to be based on an actual first transmission and the second power headroom is to be based on an actual second transmission, wherein the actual first transmission is the actual PUSCH transmission on the first uplink carrier and the actual second transmission is an actual SRS transmission on the second uplink carrier.

In some embodiments of the first method, the power headroom report for the serving cell includes the first power headroom based on a reference PUSCH transmission on the first uplink carrier of the serving cell in response to determining that the first power headroom is to be based on a reference first transmission and the second power headroom is to be based on a reference second transmission, wherein the reference first transmission is the reference PUSCH transmission on the first uplink carrier and the reference second transmission is a reference SRS transmission on the second uplink carrier.

In certain embodiments of the first method, the first transmission comprises a PUSCH transmission and the first power headroom comprises a Type-1 power headroom, and the second transmission comprises a SRS transmission and the second power headroom comprises a Type-3 power headroom. In other embodiments, the first transmission comprises a SRS transmission and the first power headroom comprises a Type-3 power headroom, and the second transmission comprises a PUSCH transmission and the second power headroom comprises a Type-1 power headroom.

In certain embodiments of the first method, the first transmission comprises a PUSCH and PUCCH transmission and the first power headroom comprises a Type-2 power headroom, and the second transmission comprises a SRS transmission and the second power headroom comprises a Type-3 power headroom. In other embodiments, the first transmission comprises a SRS transmission and the first power headroom comprises a Type-3 power headroom, and the second transmission comprises a PUSCH and PUCCH transmission and the second power headroom comprises a Type-2 power headroom.

In some embodiments of the first method, the first uplink carrier comprises a non-supplementary uplink carrier and the second uplink carrier comprises a supplementary uplink carrier. In other embodiments of the first method, the first uplink carrier comprises a supplementary uplink carrier and the second uplink carrier comprises a non-supplementary uplink carrier. In certain embodiments, the first method further includes indicating by the UE a capability parameter that indicates whether the UE supports simultaneous transmission of SRS on one of the first uplink carrier and the second uplink carrier of the serving cell and one of a PUSCH, PUCCH and SRS on the other of the first uplink carrier and the second uplink carrier in the serving cell.

In some embodiments of the first method, the serving cell is a first serving cell. Here, the first method may further comprises operating the UE with carrier aggregation on the first serving cell and a second serving cell and reporting a power headroom report comprising the first power headroom for the first serving cell on a PUSCH resource of the second serving cell. In some embodiments, the first method includes determining the first power headroom for the first uplink carrier and the second power headroom for the second uplink carrier based on a receiving a power headroom trigger.

Disclosed herein is a second method for generating a power headroom report for a serving cell configured with multiple uplink carriers, according to embodiments of the disclosure. The second method may be performed by a UE, such as the remote unit 105, the UE 205 and/or the user equipment apparatus 400. The second method includes receiving a configuration of a first uplink carrier and a second uplink carrier for a serving cell. Here, the first uplink carrier and the second uplink carrier are different. The second method includes determining a basis for a first power headroom for the first uplink carrier and for a second power headroom for the second uplink carrier. Here, each power headroom may be based on either an actual transmission or on a reference transmission. In response to determining that only one of the first or second power headroom is to be based on an actual transmission, the second method includes sending a power headroom report comprising the power headroom that is to be based on an actual transmission.

In one embodiment, the power headroom report for the serving cell comprises the first power headroom based on an actual first transmission on the first uplink carrier of the serving cell in response to determining that the first power headroom is to be based on the actual first transmission and the second power headroom is to be based on a reference second transmission. In another embodiment, the power headroom report for the serving cell comprises the second power headroom based on an actual second transmission on the second uplink carrier of the serving cell in response to determining that the first power headroom is to be based on a reference first transmission and the second power headroom is to be based on the actual second transmission.

In one embodiment, the power headroom report for the serving cell comprises the first power headroom based on an actual PUSCH transmission on the first uplink carrier of the serving cell in response to determining that the first power headroom is to be based on an actual first transmission and the second power headroom is to be based on an actual second transmission, wherein the actual first transmission is the actual PUSCH transmission on the first uplink carrier and the actual second transmission is an actual SRS transmission on the second uplink carrier.

In one embodiment, the power headroom report for the serving cell comprises the first power headroom based on a reference PUSCH transmission on the first uplink carrier of the serving cell in response to determining that the first power headroom is to be based on a reference first transmission and the second power headroom is to be based on a reference second transmission, wherein the reference first transmission is the reference PUSCH transmission on the first uplink carrier and the reference second transmission is a reference SRS transmission on the second uplink carrier.

Disclosed herein is a third method for generating a power headroom report for a serving cell configured with multiple uplink carriers, according to embodiments of the disclosure. The third method may be performed by a UE, such as the remote unit 105, the UE 205 and/or the user equipment apparatus 400. The third method includes indicating a capability for simultaneous or overlapping transmission of PUSCH on a first uplink carrier of a serving cell and SRS on a second uplink carrier of the serving cell. The third method includes receiving a configuration for PUSCH power control parameters on the first uplink carrier of the serving cell and a configuration for SRS power control parameters on the second uplink carrier of the serving cell and receiving a PHR trigger. The third method includes determining a PHR type for the serving cell based on the PHR trigger and a PHR type selection criterion and reporting a PHR for the serving cell corresponding to an uplink carrier that is associated with the determined PHR type based on corresponding power control parameters.

In some embodiments, the PHR type selection criterion is configured to report PHR Type-1 independently of respective configurations for the transmissions on the first uplink carrier and the second uplink carrier.

In certain embodiments, the third method includes identifying an uplink carrier of the first and second uplink carriers for which PUCCH is configured. In such embodiments, reporting the PHR comprises sending the PHR for the identified uplink carrier for which PUCCH is configured, and reporting the PHR comprises sending the PHR for a non-supplementary uplink ("non-SUL") carrier in response to neither the first uplink carrier nor the second uplink carrier being configured for PUCCH, the non-SUL carrier being one of the first and second uplink carriers.

In certain embodiments, the third method includes identifying an uplink carrier of the first and second uplink carriers for which PUCCH is configured. In such embodiments, reporting the PHR comprises sending the PHR for the identified uplink carrier for which PUCCH is configured, and reporting the PHR comprises sending the PHR for a supplementary uplink ("SUL") carrier in response to neither the first uplink carrier nor the second uplink carrier being configured for PUCCH, the SUL carrier being one of the first and second uplink carriers.

In some embodiments, reporting the PHR comprises sending the PHR for a non-SUL carrier, where the non-SUL carrier is either the first uplink carrier or the second uplink carrier. In such embodiments, the PHR type is Type-1 in response to PUSCH transmission on the non-SUL carrier and the PHR type is Type-3 in response SRS transmission on to the non-SUL carrier.

In some embodiments, reporting the PHR comprises sending the PHR for a SUL carrier, wherein the SUL carrier is one of the first and second uplink carriers. In such embodiments, the PHR type is Type-1 in response to PUSCH transmission on the SUL carrier and the PHR type is Type-3 in response to SRS transmission on the SUL carrier.

In some embodiments, the third method includes determining whether the PHR for the first uplink carrier is an actual PHR and determining whether the PHR for the second uplink carrier is an actual PHR. In such embodiments, the third method includes selecting a reporting carrier from the first uplink carrier and the second uplink carrier based on the determinations.

In certain embodiments, only one of the PHR for the first and second uplink carriers is an actual PHR. In such embodiments, selecting the reporting carrier comprises selecting the uplink carrier associated with an actual PHR, wherein a Type-1 PHR is selected in response to PUSCH being transmitted on the reporting carrier, and wherein a Type-3 PHR is selected in response to SRS being transmitted on the reporting carrier.

In certain embodiments, both of the PHR for the first and second uplink carriers are an actual PHR. In such embodiments, selecting the reporting carrier comprises further selecting based on carrier associated with an PHR corresponding to a PUSCH transmission, wherein a Type-1 PHR is selected in response to the PUSCH being transmitted on the reporting carrier.

In certain embodiments, none of the PHR for the first and second uplink carriers are actual PHR. In such embodiments, selecting the reporting carrier comprises further selecting based on carrier associated with an PHR corresponding to a reference PUSCH transmission, wherein a Type-1 PHR is selected in response to the reference PUSCH transmission on the reporting carrier.

In some embodiments, the PHR type selection criterion is configured to report power headroom based on a predefined alternating rule comprising a first number of Type-1 PHR followed by a second number of Type-3 PHR.

In certain embodiments, the PHR type selection criterion is configured to report PHR Type-2 independently of respective configurations for the transmissions on the first uplink carrier and the second uplink carrier. In certain embodiments, the PHR type selection criterion is configured to report one of PHR Type-2 and PHR Type-3 based on a transmission type of a reporting uplink carrier. In certain embodiments, the PHR type selection criterion is configured to report one of PHR Type-2 and PHR Type-3 based on PHR priority order for a reporting uplink carrier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment ("UE"), the method comprising:
   identifying a first transmission occasion on a first uplink carrier of a serving cell;

identifying a second transmission occasion on a second uplink carrier of the serving cell, wherein the first transmission occasion and the second transmission occasion partially overlap;

receiving a configuration for a set of Physical Uplink Shared Channel ("PUSCH") power control parameters on the first uplink carrier of the serving cell;

receiving a configuration for a set of Sounding Reference Signal ("SRS") power control parameters on the second uplink carrier of the serving cell;

detecting a power headroom report ("PHR") trigger;

determining a PHR type for the serving cell based on the PHR trigger and a PHR type selection criterion; and reporting, based on a corresponding set of power control parameters, a PHR for the serving cell corresponding to a respective uplink carrier that is associated with the determined PHR type.

2. The method of claim 1, further comprising:
determining whether the PHR for the first uplink carrier is an actual PHR;
determining whether the PHR for the second uplink carrier is an actual PHR; and
selecting the first uplink carrier or the second uplink carrier for reporting the PHR based on whether the PHR for the first uplink carrier is an actual PHR or whether the PHR for the second uplink carrier is an actual PHR.

3. The method of claim 2,
wherein the PHR for the first uplink carrier or the second uplink carrier is an actual PHR,
wherein the PHR type selection criterion comprises a transmission type for the carrier reporting the PHR,
wherein a Type-1 PHR is selected in response to the transmission type being a PUSCH transmission, and
wherein a Type-3 PHR is selected in response to the transmission type being an SRS transmission on the carrier.

4. The method of claim 2,
wherein PHR for the first uplink carrier and the second uplink carrier are an actual PHR,
wherein the carrier for reporting the PHR is selected based on the carrier being associated with the actual PHR corresponding to the PUSCH transmission, and
wherein a Type-1 PHR is selected in response to the PUSCH transmission being on the carrier for reporting the PHR.

5. The method of claim 1, further comprising indicating a capability for simultaneous or overlapping transmission of PUSCH on a first uplink carrier of a serving cell and SRS on a second uplink carrier of the serving cell.

6. A user equipment ("UE") for wireless communication, comprising:
at least one memory; and
at least one processor coupled with the at least one memory and configured to cause the UE:
identify a first transmission occasion on a first uplink carrier of a serving cell;
identify a second transmission occasion on a second uplink carrier of the serving cell, wherein the first transmission occasion and the second transmission occasion overlap;
receive a configuration for a set of physical uplink shared channel ("PUSCH") power control parameters on the first uplink carrier;
receive a configuration for a set of sounding reference signal ("SRS") power control parameters on the second uplink carrier;

detect a power headroom report ("PHR") trigger;
determine a PHR type for the serving cell based on the PHR trigger and a PHR type selection criterion; and
report, based on a corresponding set of power control parameters, a PHR for the serving cell corresponding to a respective uplink carrier that is associated with the determined PHR type.

7. The UE of claim 6, wherein the at least one processor is configured to cause the UE to send a message indicating a capability for simultaneous or overlapping transmission of a PUSCH on a first uplink carrier of the serving cell and an SRS on a second uplink carrier of the serving cell.

8. The UE of claim 6, wherein the at least one processor is configured to cause the UE to:
determine whether the PHR for the first uplink carrier is an actual PHR;
determine whether the PHR for the second uplink carrier is an actual PHR; and
select the first uplink carrier or the second uplink carrier for reporting the PHR based on whether the PHR for the first uplink carrier is an actual PHR or whether the PHR for the second uplink carrier is an actual PHR.

9. The UE of claim 8,
wherein the PHR for the first uplink carrier or the second uplink carrier is an actual PHR,
wherein the PHR type selection criterion comprises a transmission type for the carrier reporting the PHR,
wherein the at least one processor is configured to cause the UE to select a Type-1 PHR in response to the transmission type being a PUSCH transmission on the carrier.

10. The UE of claim 8,
wherein both of the PHR for the first and second uplink carriers are an actual PHR, wherein the at least one processor is configured to cause the UE to select the carrier for reporting the PHR based on the carrier being associated with the actual PHR corresponding to the PUSCH transmission, and
wherein the at least one processor is configured to cause the UE to select a Type-1 PHR in response to the PUSCH transmission being on the carrier for reporting the PHR.

11. The UE of claim 8,
wherein none of the PHR for the first uplink carrier and the second uplink carrier are actual PHR,
wherein to select the reporting carrier, the at least one processor is configured to cause the UE to select based on a carrier associated with a respective PHR corresponding to a reference PUSCH transmission,
wherein a Type-1 PHR is selected in response to the reference PUSCH transmission on the reporting carrier.

12. The UE of claim 6, wherein the PHR type selection criterion is configured for reporting PHR Type-1 independently of respective configurations for transmissions on the first uplink carrier and the second uplink carrier.

13. The UE of claim 6, wherein the at least one processor is configured to cause the UE to:
identify whether a physical uplink control channel ("PUCCH") is configured for the first uplink carrier or the second uplink carrier,
wherein to report the PHR, the at least one processor is configured to cause the UE to:
transmit the PHR for the first uplink carrier or the second uplink carrier when the PUCCH is configured for the first uplink carrier or the second uplink carrier, and transmit the PHR for a non-supplementary uplink ("non-SUL") carrier when neither the first uplink carrier nor the second uplink carrier is configured for the PUCCH, the non-SUL carrier being one of the first and second uplink carriers.

14. The UE of claim 6, wherein the at least one processor is configured to cause the UE to:
identify whether a physical uplink control channel ("PUCCH") is configured for the first uplink carrier or the second uplink carrier,
wherein to report the PHR, the at least one processor is configured to cause the UE to:
transmit the first uplink carrier or the second uplink carrier when the PUCCH is configured for the first uplink carrier or the second uplink carrier, and
transmit the PHR for a supplementary uplink ("SUL") carrier when neither the first uplink carrier nor the second uplink carrier is configured for the PUCCH, the SUL carrier being one of the first and second uplink carriers.

15. The UE of claim 6, wherein to report the PHR, the at least one processor is configured to cause the UE to transmit the PHR for a non-supplementary uplink ("non-SUL") carrier, the non-SUL carrier being the first uplink carrier or the second uplink carrier,
wherein to determine the PHR type, the at least one processor is configured to cause the UE to:
determine a PHR Type-1 in response to a PUSCH transmission on the non-SUL carrier, and
determine a PHR Type-3 in response to an SRS transmission on to the non-SUL carrier.

16. The UE of claim 6,
wherein to report the PHR, the at least one processor is configured to cause the UE to transmit the PHR for a supplementary uplink ("SUL") carrier, the SUL carrier being the first uplink carrier or the second uplink carrier,
wherein the PHR type is determined to be a PHR Type-1 in response to a PUSCH transmission on the SUL carrier, or a PHR Type-3 in response to an SRS transmission on the SUL carrier.

17. The UE of claim 6, wherein the PHR type selection criterion is configured for reporting power headroom based on a predefined alternating rule comprising a first number of Type-1 PHR followed by a second number of Type-3 PHR.

18. The UE of claim 6, wherein the PHR type selection criterion is configured for reporting PHR Type-2 independently of respective configurations for the transmissions on the first uplink carrier and the second uplink carrier.

19. The UE of claim 6, wherein the PHR type selection criterion is configured for reporting one of the PHR Type-2 and PHR Type-3 based on a transmission type of a reporting uplink carrier.

20. The UE of claim 6, wherein the PHR type selection criterion is configured for reporting one of the PHR Type-2 PHR Type-3 based on PHR priority order for a reporting uplink carrier.

* * * * *